United States Patent [19]

Meike

[11] Patent Number: 4,558,735

[45] Date of Patent: Dec. 17, 1985

[54] HEAT EXCHANGER HAVING A METAL BAFFLE PLATE SECURED TO A STEEL MEMBER

[75] Inventor: Klaus Meike, Siegen, Fed. Rep. of Germany

[73] Assignee: Schaefer Werke GmbH, Neunkirchen, Fed. Rep. of Germany

[21] Appl. No.: 539,360

[22] Filed: Oct. 6, 1983

[30] Foreign Application Priority Data

Oct. 7, 1982 [DE] Fed. Rep. of Germany ....... 3237143
Feb. 1, 1983 [DE] Fed. Rep. of Germany ....... 3303237

[51] Int. Cl.$^4$ ............................................. F28F 21/08
[52] U.S. Cl. ..................................... 165/131; 165/180
[58] Field of Search ................. 165/180, DIG. 9, 131, 165/171, 181, 149

[56] References Cited

U.S. PATENT DOCUMENTS

| | | | |
|---|---|---|---|
| 1,659,920 | 2/1928 | Murray, Jr. ........................ | 165/180 |
| 1,750,643 | 3/1930 | Murray, Jr. et al. ............... | 165/180 |
| 1,861,447 | 6/1932 | Murray, Jr. ........................ | 165/180 |
| 1,920,779 | 8/1933 | Bennett et al. .................... | 165/180 |
| 2,731,245 | 1/1956 | McChesney ...................... | 165/180 |
| 2,746,789 | 5/1956 | Ridgway ........................ | 219/91.2 X |
| 2,790,628 | 4/1957 | Barnes ............................... | 165/180 |
| 3,528,496 | 9/1970 | Kun ................................... | 165/180 |
| 3,939,908 | 2/1976 | Chartet .............................. | 165/149 |
| 4,159,034 | 6/1979 | Bellovary et al. ............... | 165/180 X |

FOREIGN PATENT DOCUMENTS

| | | | |
|---|---|---|---|
| 274559 | 12/1912 | Fed. Rep. of Germany . | |
| 54-58654 | 5/1979 | Japan ................................ | 219/117.1 |

*Primary Examiner*—Sheldon J. Richter
*Attorney, Agent, or Firm*—Flynn, Thiel, Boutell & Tanis

[57] ABSTRACT

A heat baffle plate of aluminum or another good heat-conducting metal is secured on a steel member. Since aluminum cannot be welded to steel, connections are utilized which result in a good heat-conducting connection but without direct welding. For example, a steel plate can be placed over a portion of the heat baffle plate and then be welded through openings in the aluminum plate to the steel member. The baffle plate can alternatively be supported by a form-locking engagement with a holding plate of steel which is welded to the steel member. The better heat conductivity of the aluminum baffle plate causes the heat emission or heat absorption to be substantially increased for a given structural arrangement in comparison to a heat baffle plate of steel.

25 Claims, 20 Drawing Figures

HEAT EXCHANGER HAVING A METAL BAFFLE PLATE SECURED TO A STEEL MEMBER

CROSS REFERENCE TO RELATED APPLICATION

This application is related to U.S. Ser. No. 539,607 filed concurrently herewith and entitled "METHOD FOR CONNECTING TWO PARTS WHICH CANNOT BE DIRECTLY WELDED TOGETHER".

FIELD OF THE INVENTION

This invention relates to a heat exchanger and, more particularly, to a heat exchanger which includes a member or wall of steel plate which can be hollow and have a cavity for guiding a liquid heat carrier medium, and at least one heat-conducting baffle plate which is heat-conductively connected to the steel member and projects therefrom.

BACKGROUND OF THE INVENTION

Such heat exchangers have the advantage that the heat-emitting surface area in a heating element (or the heat-absorbing surface area in an absorber of a heat pump) is substantially increased in comparison with a heat exchanger which includes only the steel wall or hollow member. The effect of the heat baffle plate increases as the heat flow in the member increases. This heat flow depends on one hand on the specific heat conductivity and on the other hand on the cross section of the member.

In a conventional heat exchanger of the above-mentioned type, the heat baffle plate is made of steel. The use of a steel baffle plate evolved because the manufacture of a heat-conducting connection can be created very inexpensively by directly welding together the heat baffle plate and the steel member. Of course, the efficiency of heat baffle plates of steel is limited because of the relatively poor heat conductivity of this material, and because for weight and cost reasons the heat baffle plate can only be of a moderate thickness and heat conduction is proportional to the sheet-metal plate thickness.

A basic purpose of the invention is to provide a heat exchanger of the above-mentioned type in which the efficiency of the heat baffle plate is substantially increased for a given plate thickness. In a further development of the basic thought of the invention, advantageous heat-conducting connections between the steel member and the heat baffle plate are provided.

SUMMARY OF THE INVENTION

This purpose is attained according to the invention by providing a heat exchanger of the foregoing type in which the heat baffle plate is made of a metal having a heat conductivity which is greater than the heat conductivity of steel, the heat baffle plate being either soldered to the steel member or held against the steel member by means of a member which is welded to the steel member.

The specific heat conductivity of common steel is approximately 40 W/mK (wherein W is in watts, m is in meters and K is in degrees Kelvin), and of rust-free fine steel only approximately 15 W/mK, while the specific conductivity of aluminum is approximately 200 W/mK, or in other words about five times the specific heat conductivity of common steel. This means that, for a given plate thickness, an aluminum plate will carry five times the heat that a steel plate will. Through this, the efficiency of the heat baffle plate is substantially increased, and therewith the efficiency of the heat exchanger. The combination of a wall of steel and a heat baffle plate of aluminum is also not a problem with respect to corrosion. It is true that aluminum and steel lie apart in the electrochemical series of the metals, but this is not a problem because an electrolyte is not as a rule present between the steel member and the heat baffle plate. Should an electrolyte appear at times in the case of an unfavorable installation, for example in the form of sweat, then this is by no means a danger for the fluid tightness of a hollow steel member, since the aluminum will be sacrificed and thus at most the aluminum baffle plate becomes corroded, but not the hollow steel member. The inventive combination is also advantageous when compared with known heating elements of aluminum, since the heating water comes into contact only with the hollow steel member and therefore steel pipes and also copper pipes can be connected directly to the heat exchanger. The interpositioning of plastic sections in the line to be connected, as is necessary in consideration of corrosion when using aluminum heat exchangers, is thus not needed when using the inventive heat exchanger. The invention also makes it possible to construct the heat baffle plate substantially longer than is sensible when using a steel baffle plate, because larger amounts of heat can be transported to regions of the baffle plate which are remote from the point of contact with the steel member, so that there still exist temperature differences with respect to the surrounding air which permit a significant heat exchange. The invention is not limited to the use of aluminum as a good heat-conducting material. Other metals with good heat conductivity can also be used, in particular many aluminum alloys and copper.

According to a further development of the invention, a steel plate engages the baffle plate, which steel plate in places extends through openings in the baffle plate and is there welded to the steel member. With this connecting technique, it is possible to utilize a very advantageous and inexpensive welding method, even though aluminum and other well heat-conducting materials cannot themselves be welded to steel. Exact alignment of the steel plate can be made substantially easier through the provision of cooperating structural parts on the steel plate and the heat baffle plate.

Prepunched holes in the heat baffle plate have the advantage that a joining by casting of the heat baffle plate is not needed and a particularly long lasting connection between the steel plate and the steel member can be created. In particular, when the steel plate is indented by a welding electrode, one achieves, even in the case of large tolerances for the hole diameters and spacings, a fixed and thus good heat-conducting engagement of the heat baffle plate with the steel member. The heat baffle plate can also be melted to create the openings, through which the advantage is obtained that the steel plate which is placed thereon has a particularly intensive and secure contact with the heat baffle plate, and through which also a particularly good heat transfer from the steel member to the heat baffle plate is achieved. When the openings in the heat baffle plate are to be created by melting during welding, the melting point of the baffle plate must be lower (at least 50° C. lower) than the melting point of steel. This condition is met by aluminum and aluminum alloys. The melting of openings in the heat baffle plate can be achieved without an additional operation if welding electrodes are used for this and, after the melting through, also effect the welding of the steel plate to the steel member. In other types of fastening, the melting point of the heat baffle plate can be higher, for example higher than the melting point of steel. The steel plate preferably has approximately the same thickness as the heat baffle plate. In another embodiment, the steel plate is not needed, for which reason this embodiment is particularly inexpensive. Here too, it is possible to use welding electrodes both for melting openings through the heat baffle plate and for creating the subsequent weld. According to a further feature, a steel holding plate is provided between the steel member and the heat baffle plate. This can then be connected in the usual manner to the steel member by welding, for example spot welding, and can have a particularly favorable surface for facilitating fastening of the heat baffle plate thereon.

According to a further development of the invention, the heat baffle plate is supported by a form-locking engagement thereof with recesses provided in the steel wall or in the holding plate which is welded to said steel member. This connection is also possible despite the fact that aluminum and steel cannot be welded together. Particularly advantageous in this type of connection is the use of the holding plate. The holding plate can easily be changed to have a shape which is suited for fastening the heat baffle plate thereto. The holding plate can be connected to the hollow member by spot welding. It can in general be more easily provided with a shape which is suited for the mounting of the heat baffle plate than is possible with the steel member itself. The heat transfer occurs in this case from the steel member to the holding plate and then to the heat baffle plate. In particular, the holding plate also has a heat-conducting function.

The heat baffle plate preferably has no surface coating. This is possible because aluminum is corrosion-resistant even without a surface coating. This is advantageous for the heat exchange with the surroundings, since the heat-conductivity resistance which a surface coating usually produces does not exist.

Thicknesses of between 0.3 and 0.5 mm give the baffle plate a relatively good physical stability and have a heat conductivity which corresponds with that of a steel plate having a thickness of between 1.5 and 2.5 mm. Because of the high specific conductivity, however, it is also possible to use a baffle plate which is thinner than 0.3 mm. In this case, a protected arrangement of the baffle plate is advantageous in order to avoid deformation thereof.

The inventive heat exchanger can be realized both with several individual heat baffle plates and also with one or more long, bent baffle plates. Because of the good heat conductivity, it can be advantageous in both embodiments to shape each heat baffle plate so that the heat-absorbing or heat-emitting surface area thereon is as large as possible.

A connection of materials which cannot be welded to one another is often possible by soldering. Thus the invention also includes a heat exchanger in which the baffle plate is connected directly to the steel member by a soldering connection and has a better heat conductivity than steel.

BRIEF DESCRIPTION OF THE DRAWINGS

Exemplary embodiments of the invention are illustrated in the drawings, in which.

DETAILED DESCRIPTION

Figure 1:
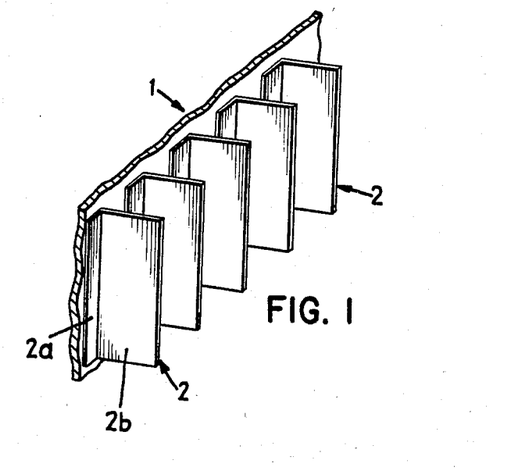
FIG. 1 is a fragmentary perspective view of a heat exchanger which embodies the present invention, including a wall of a hollow steel member with several bent heat baffle plates secured thereon.
Figures 2, 3:
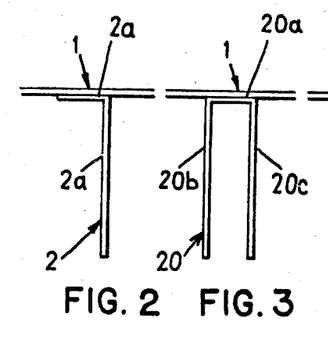
FIG. 2 is a fragmentary top view of the heat exchanger according to FIG. 1 showing a bent heat baffle plate.
FIGS. 3 to 6 are fragmentary top views similar to FIG. 2 of respective variations of the heat baffle plate of FIG. 2.

The heat exchanger according to FIG. 1 has a hollow steel member 1 and heat baffle plates 2 which are connected heat-conductingly with the hollow steel member 1. The heat baffle plates 2 are bent to be L-shaped, as is illustrated in FIG. 2. The hollow member 1 is made of steel and can, for example, include two cuplike parts which are welded together at their edges, similar to the parts 26 and 27 shown in FIGS. 13 and 14. The heat baffle plates 2 are made of a different material having a heat conductivity which is greater than the heat conductivity of steel. Particularly well suited for this are aluminum and aluminum alloys. It is assumed hereinafter that, in the illustrated exemplary embodiments, heat baffle plates of aluminum are used. Aluminum and steel, as is known, cannot be welded together. In order to create therebetween a good heat-conducting connection, the following constructions are therefore used.

Figure 7:
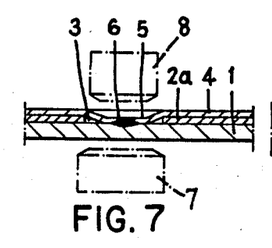
FIG. 7 is a fragmentary sectional top view of the embodiment of FIG. 1 in the region of the fastening of the heat baffle plate on the hollow steel member, showing a steel plate which is placed thereon and has a portion received in a perforation in the heat baffle plate.

In FIGS. 1 and 2, each heat baffle plate has a leg 2a which is parallel to the hollow steel member 1 and a leg 2b which projects from the hollow steel member 1 perpendicular thereto. As shown in FIG. 7, the leg 2a has holes 3 therethrough. A sheet-metal strip 4 rests on the side of the leg 2a remote from the steel member 1. The sheet-metal strip 4 is a steel plate and has, in the region of each hole 3, a depression 5 which on the other side of the plate forms a boss which projects through the associated hole 3 and is connected to the hollow steel member 1 by spot-welding. The welding zone is identified with reference numeral 6.

The leg 2a is fixedly secured to and pressed against the hollow steel member 1 by the steel plate 4, and in this manner a good heat-conducting connection is created. The welding is done by means of conventional spot-welding electrodes 7 and 8 which are movable toward and away from each other and, during the welding, contact the hollow member 1 and plate 4.

The electrodes 7, 8 are illustrated in the pulled-back condition in FIG. 7. During the welding operation, the electrode 8 is pressed against the steel plate 4 and the electrode 7 against the hollow steel member 1. The electrode 8 also produces the indentation or depression 5 in the plate 4. Prior to actuation of the electrode 8, the plate 4 is flat in the region of each hole 3 in the leg 2a.

Figure 8:
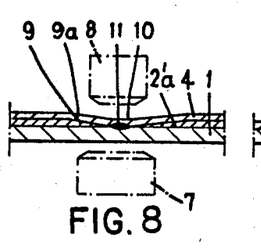
FIG. 8 is a fragmentary sectional top view similar to and showing a variation of FIG. 7, during the manufacture of which openings are melted through the heat baffle plate.

In the embodiment according to FIG. 8, a similar steel plate 4 is used for fastening the leg 2'a of the heat baffle plate to the steel member 1, but prepunched holes in the leg 2'a do not exist here. The plate 4 is connected to the steel wall of the hollow member 1 by causing the leg 2'a to have a hole melted through it at the welding point during the welding. In particular, a hole 9 is created, the wall 9a of which is not cylindrical, but has approximately the shape of a cone frustum. The sheet-metal strip 4 is here too indented or depressed (at 10), but the indentation is flatter. Since the formation of the hole 9 is done by melting, one obtains a hole wall 9a which conforms to the shape of the indentation 10, through which a particularly intensive and secure contact is created. The actual welding point is identified here with reference numeral 11. To create the weld, spot-welding electrodes 7 and 8 are again used, which are illustrated in FIG. 8 in a slightly pulled-back position.

Figure 9:
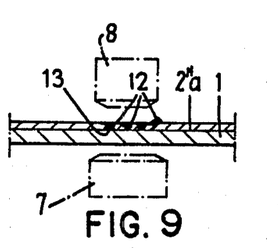
FIG. 9 is a fragmentary sectional top view similar to and showing a variation of FIG. 7, in which the fastening of the heat baffle plate is effected by means of embedded steel particles.
Figure 10:
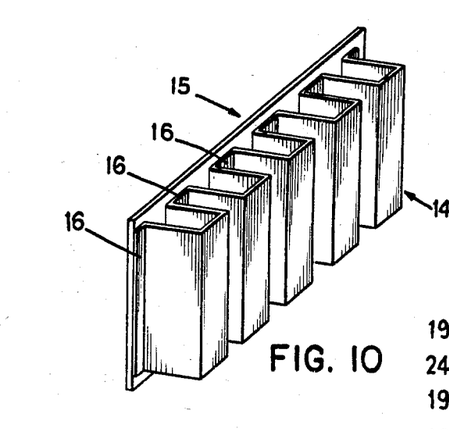
FIG. 10 is a perspective view of an alternative embodiment of the heat exchanger of FIG. 1, in which a long, bent metal plate is used as the baffle plate.

In the embodiment according to FIG. 9, steel particles 12 are embedded into the leg 2″a of the baffle plate. These steel particles 12 are welded to the steel member 1, for example the wall of a hollow member. During the creation of the weld, the steel particles 12, which can consist of a waste material, are sprinkled over the leg 2″a. By pressing with the electrodes 7 and 8, and by the welding current heating up the material of the heat baffle plate, the baffle plate is softened and the particles 12 are pressed into the soft material. The particles 12 of steel have a substantially higher melting point than the aluminum baffle plate. Finally, at least some of the particles 12 come into contact with the steel member 1, so that a welding together takes place. The welding points are identified here with reference numeral 13. The embodiment according to FIG. 9 has the advantage that special steel plates of the type used in the embodiments according to FIGS. 7 and 8 are not needed.

Figures 4, 5, 6:
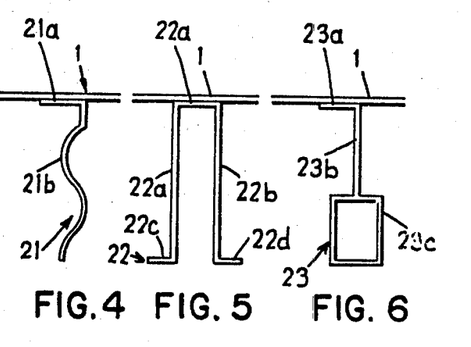

FIGS. 3 to 6 illustrate further shapes for heat baffle plates. FIG. 3 illustrates a U-shaped heat baffle plate 20, which has a bight or web 20a and spaced, parallel, outwardly projecting legs 20b, 20c. The web 20a can be connected to a hollow steel member in the same ways discussed in connection with FIGS. 7 to 9. FIG. 4 illustrates a heat baffle plate 21 with a flat leg 21a and a sinuously curved leg 21b. The leg 21a can be secured to the steel member 1 in any manner already described. The sinuous shape of the leg 21b results in an enlargement of its surface area, for a given length, in comparison with a straight leg. Due to the good heat conduction in aluminum, such a surface area enlargement is advantageous.

FIG. 5 illustrates a heat baffle plate 22 with a hat-shaped cross section. This differs from the shape according to FIG. 3 in that bent edge portions 22c and 22d are provided at the outer ends of the legs 22a and 22b, which also causes the surface area to be enlarged. FIG. 6 illustrates a heat baffle plate 23 with a fastening leg 23a, a support leg 23b which extends outwardly at a right angle thereto, and a tubular part 23c of rectangular cross section which is provided at the outer end of the leg 23b. This heat baffle plate can also be secured in a manner like the other heat baffle plates. Again, a relatively large surface area is achieved by providing the tubular part 23c.

A heat exchanger illustrated in FIGS. 10 to 14 has, in place of several individual heat baffle plates, a long baffle plate 14 which is bent to a rectangular or squared-off sinuous or S-shape, and is secured on a hollow steel member 15. The fastening of the baffle plate 14 to the member 15 is preferably carried out in the same manner discussed already in connection with FIG. 7.

The heat baffle plate 14 rests with heat-transmitting regions 16 thereof against the hollow member 15. A loop 17 exists between each adjacent pair of such contact regions, which loops give heat off to the surrounding air (in the case of a heating element) or absorb heat from the surrounding air (in the case of a heat absorber). A strip 18 of steel plate rests against each heat-transmitting area 16, which plate 18 during the creation of the connection is pressed through holes which are provided in the heat-transmitting areas 16 of the baffle plate.

Figure 11:
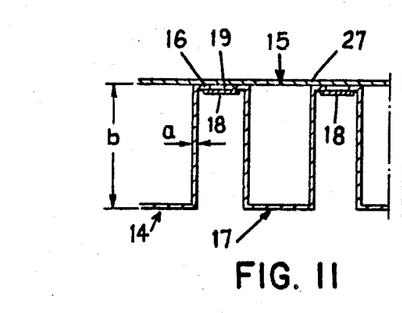
FIG. 11 is a fragmentary sectional top view of the heat exchanger of FIG. 10 prior to the fastening of the heat baffle plate to the hollow steel member.
Figure 12:
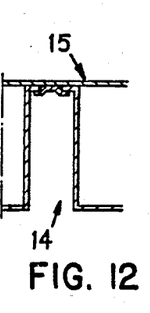
FIG. 12 is a fragmentary sectional top view similar to FIG. 11 and showing the completed fastening of the heat baffle plate to the hollow steel member.
Figure 13:
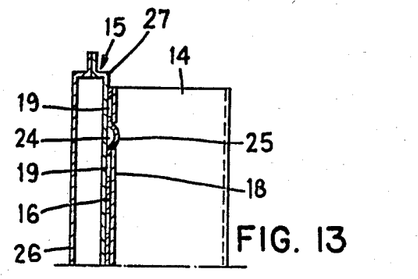
FIG. 13 is a fragmentary sectional end view of the heat exchanger according to FIG. 10 prior to the fastening (and thus corresponds to FIG. 11)
Figure 14:
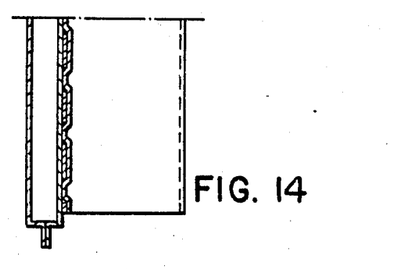
FIG. 14 is a fragmentary sectional end view of the heat exchanger of FIG. 10 after the fastening (and thus corresponds to FIG. 12)

FIGS. 11 and 13 illustrate the condition prior to welding. In this condition, the steel-plate strips 18 are still flat. FIGS. 12 and 14 illustrate the condition after the welding. In this respect, FIGS. 12 and 14 correspond to FIG. 7. In order to make proper alignment of the sheet-metal strips 18 with the baffle plate easier, the baffle plate has at every heat-transmitting area 16 a boss or elevation 24 which is aligned with a corresponding recess 25 in the steel plate 18. FIG. 14 illustrates the condition after the welding. It is also possible to press the elevation and recess 24 and 25 flat during the welding. However, this does not have to be done.

The hollow steel member 15 is composed of two cups or parts 26 and 27 which have their outer edges secured to each other. It is stated at this point that the member on which the baffle plate is secured need not necessarily be a hollow member. For example the steel-plate wall, on which the baffle plate is secured could also be electrically heated, for which a hollow member which can carry a flowable heat-carrying medium is not needed.

The height of the baffle plate loops 17 is identified with b in FIG. 11, and the thickness of the baffle plate with a. For a given sheet-metal thickness a, the height b can be substantially greater for an aluminum baffle plate than would be sensible if the baffle plate were made of steel. Because of the substantially better heat conductivity of aluminum, even for a relatively large height b a lot more heat can be conducted into the outer portions of the loops, so that there still exists a significant temperature difference compared with the surrounding air.

Figure 15:
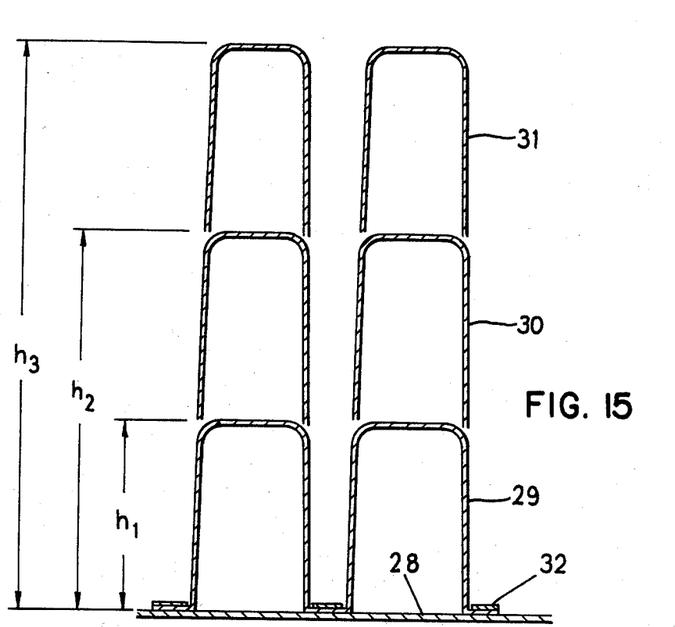
FIG. 15 is a fragmentary sectional top view of a further alternative embodiment of the heat exchanger of FIG. 1, in which different height baffle plates are illustrated.

FIG. 15 illustrates an embodiment which in most respects corresponds to the embodiment according to FIGS. 10 to 14. FIG. 15 shows that it is possible to secure, on one steel wall 28, baffle plates 29, 30 or 31 having various respective heights $h_1$, $h_2$ and $h_3$. Here again, fastening is effected with steel plates 32. The width of the different height baffle plates is the same, so that for all of these baffle plates the same steel wall 28 can be used. The selection of the appropriate baffle plate then occurs according to the particular temperature differences and the desired output of the heat exchanger.

Figure 16:
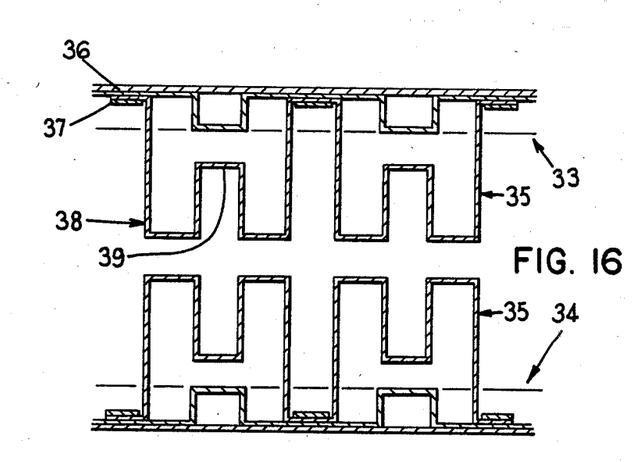
FIG. 16 is a fragmentary sectional top view of a heat exchanger with two hollow steel members and long, bent heat baffle plates which are secured on the hollow steel members.

FIG. 16 illustrates another way of bending baffle plates so that a relatively large surface area is achieved. FIG. 16 illustrates walls of two hollow steel members 33 and 34 which have secured on the sides thereof which face one another heat baffle plates 35. The heat baffle plates 35 have heat-transmitting regions 36 which engage the hollow members 33 and 34. These are also secured by means of steel-plate strips 37 which are welded to the associated hollow member. The baffle plates 35 have loops 38 which project outwardly from the hollow steel member between adjacent heat-transmitting regions 36. The loops 38 are formed by bends in the baffle plates 35 which, in the outermost portions thereof, have a rectangular recess 39 which gives them a squared-off S-shape which substantially enlarges their surface area and thus the contact surface for the surrounding air. Also in this manner, the good heat conductivity of aluminum can be fully utilized. This construction is also advantageous if the maximum height of the heat baffle plate is predetermined and a large surface area for the heat baffle plate is desired.

Figure 18:
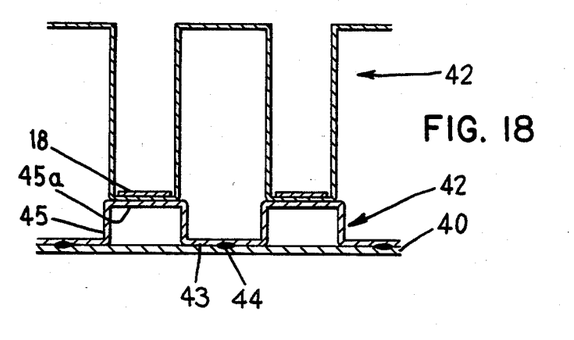
FIG. 18 is a fragmentary sectional top view similar to FIG. 17 of a further embodiment in which a connection to a holding plate according to FIGS. 7 to 13 is provided.

FIG. 18 illustrates an embodiment in which a holding plate 41 of steel is secured on a steel wall 40, to which plate 41 the actual heat baffle plate 42 of aluminum is then connected.

The holding plate 41 has a squared-off S-shape and is connected at fastening regions 43 by means of spot weldings 44 to the steel wall 40. Loops 45 thereof extend outwardly between the fastening areas 43, which loops 45 each have a flat outer wall 45a which is connected to the heat baffle plate 42. The baffle plate 42 is constructed to correspond to FIGS. 10 to 14, and is secured in the same manner by means of steel-plate strips 18. In this embodiment, the holding plate 41 has a heat-conducting function, since it must transmit heat between the steel wall 40 and the heat baffle plate 41. The holding plate 41 also has air circulating around it, so that it can directly give off or absorb heat.

Figure 17:
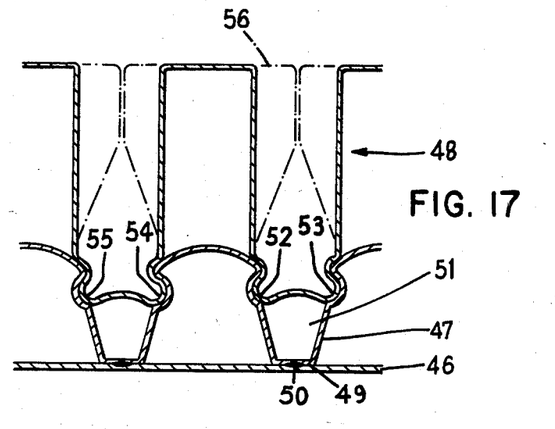
FIG. 17 is a fragmentary sectional top view of a further embodiment of the heat exchanger of FIG. 1, in which the heat baffle plate is supported by form-locking engagement thereof with a holding plate provided on the hollow steel member.

In the embodiment according to FIG. 17, a holding plate 47 is secured on a steel wall 46. The holding plate 47 serves to clamp a heat baffle plate 48. The holding plate 47 has fastening portions 49 which are connected to the steel plate 46 by spot weldings 50. This is possible through the use of the same materials for the parts 46 and 47.

The fastening plate 49 is bent to have spaced recesses or grooves 51 which each have spaced side walls, each side wall being bent to define grooves or undercut sections 52, 53. The heat baffle plate 48 which consists of aluminum has an approximately squared-off S-shape. The portions of the baffle plate 48 adjacent the steel plate 46 have projections 54 and 55 which engage the undercut sections 52 and 53.

The mounting can, for example, be done in such a manner that the heat baffle plate 48 is moved into the grooves 51 in a direction normal to the plane of the drawing. Also, it is possible to effect a deformation such that, for a direction of movement parallel to the plane of the drawing, the portions of the baffle plate adjacent the steel plate 46 can be placed into the grooves. Such a deformation is indicated by the dash-dotted lines 56.

In the embodiment according to FIG. 17, and in the case of heat emission from the steel wall 46, heat is first guided through the holding plate 47. Heat is then guided into the heat baffle plate 48 at the contact points with the holding plate 47 in the region of the grooves 51. To achieve good heat transmission, it is desirable that as much of the heat baffle plate 48 as possible engage without clearance the holding plate 47.

Figure 19:
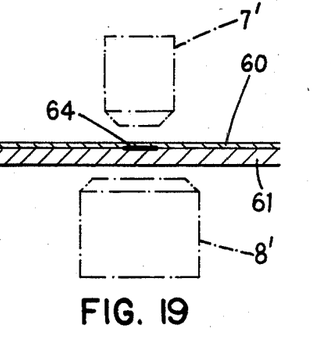
FIG. 19 is a fragmentary sectional top view similar to FIG. 7, which shows a heat baffle plate connected to a steel wall by a soldering connection.
Figure 20:
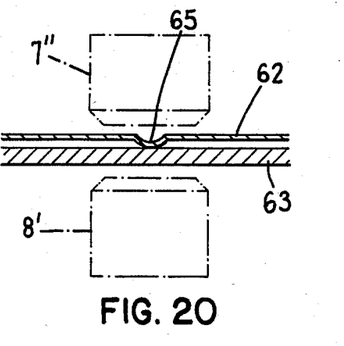
FIG. 20 is a fragmentary sectional top view similar to FIG. 19, illustrating a soldering point which is localized by embossing of the heat baffle plate.

FIGS. 19 and 20 illustrate the manufacture of a heat exchanger in which the heat baffle plate is connected to the steel wall by means of a soldering connection. In FIG. 19, the steel wall is identified with reference numeral 61 and the heat baffle plate with reference numeral 60. The heat which is needed for the soldering is provided by electrodes 7', 8' and is conducted through the sheet-metal plates 60 and 61. A soldered point 64 is thus formed. The size of the soldered point 64 is determined by the shape of the electrode 7', which in this case is of relatively small diameter.

In FIG. 20, the steel wall is identified with reference numeral 63 and the heat baffle plate with reference numeral 62. The heat baffle plate 62 has an indentation or depression 65 in one side thereof at the soldering point, which produces a boss on the opposite side thereof which engages the steel wall 63 prior to the start of the soldering operation. During the creation of the soldering connection, current is conducted through the plates 62, 63 from the electrodes 7'', 8' and thus the heat needed for the soldering is produced. The soldering starts in the area of the boss 65 which, during the course of the soldering, is pressed flat so that the heat baffle plate 62 engages the steel plate 63 without any space therebetween. Since in the arrangement according to FIG. 20, the soldering point is localized by the provision of the boss 65, the upper electrode 7'' can have a substantially greater diameter than the soldering point.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A heat exchanger, comprising a steel member and at least one heat baffle plate which is connected heat-conductingly to and projects outwardly from said steel member, wherein said heat baffle plate is made of a metal having a heat conductivity greater than the heat conductivity of steel, wherein said heat baffle plate is held against said steel member by a further member which is welded to said steel member, and wherein said further member is a steel plate which rests against said heat baffle plate and in plural locations has portions which project through openings in said heat baffle plate, each said portion being welded to said steel member.

2. The heat exchanger according to claim 1, wherein said heat baffle plate is made of aluminum or an aluminum alloy.

3. The heat exchanger according to claim 1, wherein said steel member is a hollow member which is made of platelike steel material and has a cavity for guiding liquid heat carrier medium, and wherein said heat baffle plate has a boss which engages a recess provided in said further member in order to align said further member and said heat baffle plate.

4. The heat exchanger according to claim 1, wherein said openings through said heat baffle plate are previously punched therein and said steel plate is indented in the region of each said portion thereof.

5. The heat exchanger according to claim 1, wherein the melting point of said heat baffle plate is lower than the melting point of steel, wherein said openings said heat baffle plate are formed by melting and evaporation of the material of said heat baffle plate during welding, and wherein an edge of each said opening engages the surface of the portion of said steel plate which projects into the opening.

6. The heat exchanger according to claim 1, wherein said steel plate has approximately the same thickness as said heat baffle plate.

7. The heat exchanger according to claim 1, wherein said heat baffle plate is free of a surface coating.

8. The heat exchanger according to claim 1, wherein said heat baffle plate has a thickness in the range of 0.1 mm to 0.8 mm.

9. The heat exchanger according to claim 1, including a plurality of said heat baffle plates which are each secured on said steel member.

10. The heat exchanger according to claim 9, wherein said heat baffle plates are each bent and each have a fastening leg disposed against said steel member and a further leg which projects outwardly from said steel member.

11. The heat exchanger according to claim 10, wherein each said heat baffle plate is substantially U-shaped and has a web which is said fastening leg and is disposed against said steel member.

12. The heat exchanger according to claim 1, wherein said heat baffle plate has several loops, the apex regions of said loops being disposed against said steel member.

13. The heat exchanger according to claim 12, wherein said loops project outwardly from said steel member and are shaped so that they have a relatively large surface area.

14. A heat exchanger, comprising a hollow steel member which has a cavity through which a liquid heat carrier medium can flow and a heat baffle plate which is dipsosed heat-conductingly against said steel member and projects outwardly therefrom, wherein said heat baffle plate is made of a metal having a heat conductivity which is greater than the heat conductivity of steel, and wherein said heat baffle plate is held against said steel member by a further member which is welded to said steel member.

15. The heat exchanger according to claim 14, wherein said heat baffle plate is made of aluminum or an aluminum alloy.

16. The heat exchanger according to claim 14, wherein said further member is a steel plate which is disposed against said heat baffle plate on a side thereof remote from said steel member and in plural locations has portions which project into openings provided through said heat baffle plate, each said portion being welded to said steel member, and wherein said heat baffle plate has a boss which, for aligning said steel plate and said heat baffle plate, engages a recess provided in said steel plate.

17. The heat exchanger according to claim 16, wherein said heat baffle plate has said openings created therein prior to assembly of said heat exchanger, and wherein each said portion of said steel plate is indented.

18. The heat exchanger according to claim 16, wherein the melting point of said heat baffle plate is lower than the melting point of steel, wherein said openings in said heat baffle plate through which said portions of said steel plate project are formed by melting and evaporation of the material of said heat baffle plate during welding, and wherein an edge of each said opening engages the surface of the associated portion of said steel plate which projects into such opening.

19. The heat exchanger according to claim 16, wherein said steel plate has approximately the same thickness as said heat baffle plate.

20. The heat exchanger according to claim 14, wherein the melting point of the material of said heat baffle plate is lower than the melting point of steel; including a plurality of said further members; and wherein each said further member is a steel particle which is embedded in said heat baffle plate and is welded to said steel member.

21. The heat exchanger according to claim 14, wherein said heat baffle plate is bent and has a fastening leg which is disposed against said steel member and a further leg which projects outwardly from said steel member.

22. The heat exchanger according to claim 21, wherein said heat baffle plate includes a rectangular tubular portion attached to said further leg at an end thereof remote from said steel member.

23. The heat exchanger according to claim 21, wherein said further leg is bent to have a sinuous shape.

24. The heat exchanger according to claim 14, wherein said heat baffle plate is substantially U-shaped and has a web which is disposed against said steel member.

25. The heat exchanger according to claim 14, wherein said heat baffle plate is bent to have a sinuous shape and has a plurality of spaced fastening portions which are provided at spaced locations therealong and which are each disposed against said steel member, and including a plurality of said further members which are each a steel plate disposed against a respective said fastening portion of said heat baffle plate on a side thereof remote from said steel member and which are each welded to said steel member through an opening provided in the adjacent fastening portion of said heat baffle plate.

* * * * *

UNITED STATES PATENT AND TRADEMARK OFFICE
CERTIFICATE OF CORRECTION

PATENT NO. : 4 558 735

DATED : December 17, 1985

INVENTOR(S) : Klaus Meike

It is certified that error appears in the above-identified patent and that said Letters Patent is hereby corrected as shown below:

Column 9, line 32; after "openings" insert ---in---.

Signed and Sealed this

Eighth Day of July 1986

[SEAL]

Attest:

DONALD J. QUIGG

Attesting Officer

Commissioner of Patents and Trademarks